United States Patent Office 3,499,659
Patented Mar. 10, 1970

3,499,659
MATERIAL HANDLING MEANS
Custer E. Capadalis, Memphis, Tenn.
Continuation-in-part of application Ser. No. 556,177,
June 8, 1966. This application Nov. 18, 1968, Ser.
No. 776,344
Int. Cl. B62b 3/12, 5/02
U.S. Cl. 280—47.2          10 Claims

ABSTRACT OF THE DISCLOSURE

In a material handling device of the type incorporating a structure having a base plate and back support which is manually movable upon a pair of wheels, a rod connects to the structure along its back support and retains a slide bracket and connecting supplemental wheel, said slide bracket capable of being shifted along the rod or being fixed at an adjusted position. The slide bracket while capable of being shifted longitudinally along the rod may also be slid forwardly or rearwardly of said rod with respect to the back support so as to extend or retract said supplemental wheel. In this manner and through the co-operation of the aforementioned wheels, the material handling device may be disposed at almost any angle with respect to the horizontal or the surface upon which it rests. A handle connects with the rod, parallel to the back support, and upon its removal may be utilized as a linkage for interconnecting a pair of the devices for tandem movement.

CROSS REFERENCE TO RELATED APPLICATION

The subject matter of this application is related to and comprises a continuation-in-part of the application of Custer E. Capadalis, Ser. No. 556,177 filed on June 8, 1966, and issued on Nov. 19, 1968, as Patent No. 3,411,-798.

BACKGROUND OF THE INVENTION

This invention relates generally to an improvement in material handling means, and more particularly, pertains to a material handling device which when laden with cargo may be disposed at any inclined angle with respect to the ground, and may be moved in tandem fashion when joined with other like devices.

Heretofore the hand trucks utilized for cartage of products and cargo, or the like, were simply constructed as frame members having a pair of wheels mounted to the bottom end and having a handle projecting from its upper end. Although these devices were adequate for assisting in the transfer of heavy goods once the goods were located in place upon a truck and it was tilted by manual force to an angle which rendered the wheels an effective fulcrum, they grossly lacked the improving features which made them increasingly efficient in operation and facile of handling. Ordinarily, a worker attempting to use the type of hand trucks heretofore disclosed in the prior art would frequently have to exert such physical force that muscle strain or other impairment would result. For example, if the hand truck contained a substantial and heavy load, when the worker attempted to tilt the truck rearwardly so as to achieve fulcrumming of its wheels, not too infrequently the truck would tilt too far forcing the worker to strain himself in attempting to once again upright the device. In addition, in the use of a prior art truck that possesses a projecting or curved handle extending from its upward portion, when the foregoing type problem is encountered the handle oftentimes catches the worker causing either a tearing of his clothing or damage to his person.

Certain hand trucks previously devised included auxiliary casters which could be clamped to the side frame members of the truck structure, as when it was desired to utilize the same as a horizontally disposed dolly. These caster arrangements were quite permanent and appeared to be employed only when the truck was to be utilized for any length of time as a dolly. Furthermore, it does not seem likely that these previous devices could be adapted to orient the truck upon a fixed incline, even to the vertical, so as to facilitate and render convenient its transfer by a workman after the same had been loaded with cargo.

In the co-pending application as previously defined, the material handling device disclosed therein improved the conditions for use of the standard hand truck, and is especially useful in assisting to alleviate the extra force that must be exerted especially when transferring heavy cargo up or downstairs or over a curb or step. The present invention improves upon this embodiment, even further facilitating the handling of excessive loads, and in reduced time.

It is, therefore, the principal object of this invention to provide a material handling device which either prior to and/or subsequent to its being loaded with cargo may be disposed in an angular relationship with respect to the surface upon which it rests, thereby making it easier for the worker to move the device without having to overexert himself in attempting to find the fulcrum point of the device with respect to its added load.

It is a further object of this invention to provide a material handling device incorporating a third wheel assembly which may be slidably adjusted either longitudinally of the device, or may be raised or lowered to furnish fine adjustment.

It is another object of this invention to provide a material handling device employing a handle which may be easily grasped to induce transit of the loaded device, but does not protrude or project in a manner as to cause any damage in the event that the device becomes unwieldy.

It is yet another object of this invention to provide a material handling device wherein its handle may be converted and employed as a linkage to allow for tandem association of a plurality of the loaded devices thereby achieving their simultaneous movement from a singular prime mover.

It is still a further object of this invention to provide a material handling device which although incorporating all the adjustable features as heretofore discussed, presents no obstruction to a large capacity load that may be deposited upon it during usage.

It is an additional object of this invention to provide a material handling device which is easily handled, capable of quick and simple adjustment due to the convenience at which its adjustable parts are readily disposed for manipulation, said device being useful for a plurality of purposes either in the nature of a dolly, an upright stand, or for manual cartage.

These and other objects will become apparent to those skilled in the art in light of the following description and accompanying drawing.

SUMMARY OF THE INVENTION

This invention contemplates the forms of material handling means, or more specifically the carts or trucks, that are presently in existence, and through various modifications adapts these handling means to improve their operation and make them more easier to handle. The types of improvements defined herein may be more categorically defined as follows:

(a) A provision of a third wheel assembly which pivotally mounts to a slide bracket that may be shifted in two different directions so as to provide for a stationary positioning of the device to any inclination desired.

March 10, 1970     C. E. CAPADALIS     3,499,659
MATERIAL HANDLING MEANS
Filed Nov. 18, 1968
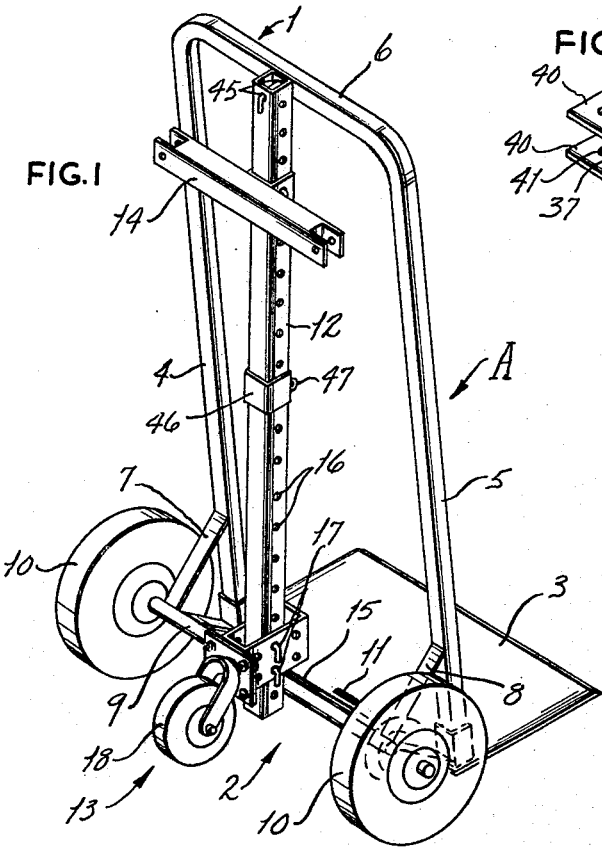
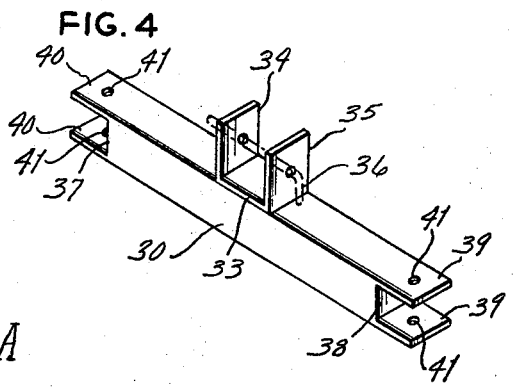
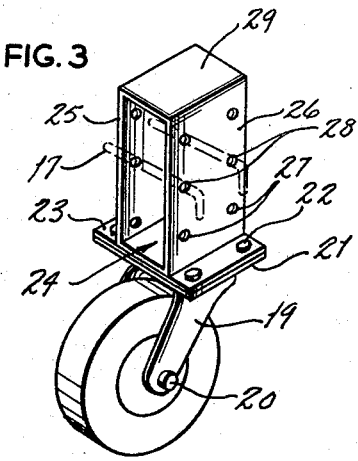
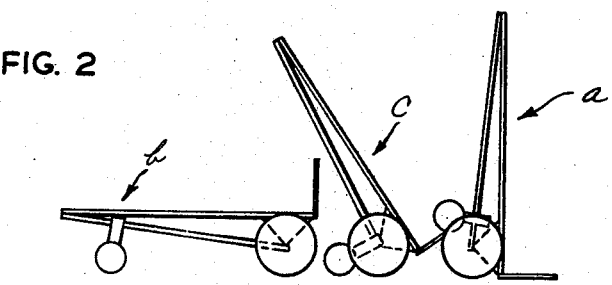
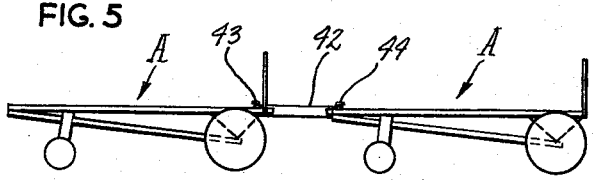
INVENTOR
CUSTER E. CAPADALIS
BY
*Paul M. Denk*
ATTORNEY as to provide easily achievable and manageable fulcrumming of any cargo that may be loaded upon the device.

It is to be noted that the base plate 3 is provided with an aperture 11 therethrough and located proximate the rearward edge of said plate, the purpose of this aperture to be hereinafter more fully described.

Spanning the full distance between the upper portion of the back support 1 and the lower structure 2 is a rod 12, which more specifically, mounts at its upward end to the top brace member 6 while attaching at its lower end to the axle shaft 9. The purpose of this rod is to accommodate structurally the third wheel assembly 13, and the handle 14, both being herein shown as mounting to said rod. Although the rod is described as attaching to the axle shaft 9, it should be comprehended that the rod 12 may mount stably to any portion of the lower structure 2 of the device, including connecting with the back edge 15 of the base plate 3. The rod 12 is disclosed as containing a series of apertures, as along 16, throughout its length, and the purpose for these spaced apertures is to provide the means for mounting either the third wheel assembly 13 or the handle 14 at any particular position along said rod.

The third wheel assembly 13 is herein shown being mounted to the rod 12 by means of a series of retaining pins 17. See also FIGURE 3. This assembly is disclosed as comprising a casterable wheel 18 which is rotatably mounted to the arms, one being shown at 19, by means of the axle 20. The arms 19 pivotally connect to a swivel plate 21, which in turn is mounted by means of the bolts 22 to a plate 23 formed integrally with the slide bracket 24. The slide bracket comprises a pair of plates 25 and 26 which are spaced apart that amount of distance which allows for their snug but sliding fitting upon the rod 12, normally positioned therebetween. Each plate is provided with a series of aligned pairs of apertures, as at 27, so that when the slide bracket is mounted to the rod 12 by means of the insertion of the pins 17 therethrough, not only will the bracket be stationarily affixed to the rod at a location along its longitudinal dimension, but the forward or rearward projection of the third wheel assembly with respect to the rod may be adjusted and fixed depending upon which row of aperture are employed. As herein shown, the intermediate row of aligned apertures, as at 28, are employed in positioning the slide bracket upon the rod. For structural support the slide bracket includes a top plate 29 integrally connecting to the plates 25 and 26, and is used for retaining the slide bracket permanently upon the rod, although this upper plate is not essential to the construction of the bracket.

The handle utilized in the construction of this invention is more fully disclosed in FIGURE 4, and includes a length of rod 30 which is of sufficient dimension to allow for easy grasping of either of its sides arms 31 and 32 by a worker. Connecting centrally to the rod 30 is an inverted U-bracket 33 including a pair of upright flanges 34 and 35 which are spaced apart that distance which will allow for their snug contact on either side of the rod 12, as when the handle is affixed to said rod by means of insertion of the pin 36 through the apertures of both the handle flanges and the rod. Formed at each end of the handle rod 30 are a pair of slots 37 and 38, with the overlying extended portions 39 and 40 of the handles having aligned apertures 41 provided therethrough.

By referring to FIGURE 5, the use of a pair or more of the material handling devices A are shown being employed in tandem fashion. Each of the devices, as disclosed, are linked together by means of an adaptation of the previously described handle, herein illustrated being employed as a linkage 42. To accomplish such, and by referring also to FIGURES 1 and 4, the upper extended portion 40 of the slotted end 37 of the end of the handle is inserted through the aperture 11 of the base plate of the forwardmost horizontally disposed device A, and a pin 43 inserts through the apertures 41 at this end of the handle thereby loosely connecting the handle to this base plate. The other slotted end 38 of the handle is pivotally mounted by means of the pin 44 to the upward end of the back support of the following device A, or more specifically to the point of intersection of the rod 12 with the top brace member 6. The pin 44 inserts through the apertures 41 of the handle, and also inserts through the aligned apertures 45 provided through the rod and brace member. In this manner, the handle is somewhat pivotally connected to both of the aligned material handling devices, and by exerting a pulling force upon the forward device, the remaining devices will follow its same course of travel, regardless whether it be in a straight line or around a curve. It is to be noted that these devices when employed in a tandem arrangement have their third wheel assemblies 13 shifted towards the upward segments of the rods 12, so as to furnish equal balance for any load that may be stored upon the respective devices.

It should be remarked, referring again to FIGURE 1, that a length of sleeve 46 is slidably mounted upon the rod 12, and contains a connecting eyelet 47 which is useful for engaging with means, such as a strap, employed in securing any cargo to the material handling device.

Having thus described the invention, what is claimed and desired to be secured by Letters Patents is:

1. A material handling device comprising:
   a generally L-shaped frame including a back portion and a base portion;
   a pair of wheels mounted on the frame at the lower end of the base portion on the opposite side thereof from the base portion;
   a rod mounted on the frame and extending angularly and rearwardly with respect to the back portion thereof from a point adjacent the upper end of the back portion to a point between the wheels;
   an auxiliary wheel slidably supported on the rod, and means for locking the auxiliary wheel with respect to the rod at two points, one adjacent the upper end of the back portion and one adjacent the lower end thereof.

2. The material handling device according to claim 1 wherein the locking means includes at least two holes formed through the rod and at least one pin mounted for engagement with the selected ones of the holes to prevent sliding of the auxiliary wheel with respect to the rod.

3. The material handling device according to claim 1 further including an axle extending between the wheels and wherein the rod is connected to the axle.

4. The material handling device according to claim 1 further including an elongate handle and means for alternately attaching the handle to the rod in three different positions wherein the handle extends in three different directions with respect to the rod.

5. The material handling device according to claim 4 wherein the base portion of the frame has a hole formed through it and further including means for connecting the handle to the base portion through the hole and thereby coupling the device to another vehicle.

6. In a material handling device of the type including a back, a base extending generally perpendicularly with respect to the back and a pair of wheels mounted at the bottom of the back opposite the base, the improvement comprising:
   a beam extending angularly and rearwardly with respect to the back from the top to the bottom thereof;
   an auxiliary wheel mounted on the beam for movement along the length thereof, and
   means for locking the auxiliary wheel against movement with respect to the beam at two points, one adjacent one end of the beam and the other adjacent the other end.

7. The improvement according to claim 6 further characterized in that the beam diverges away from the back from a point adjacent the upper end thereof to a point more distant from the lower end.

8. The improvement according to claim 6 further characterized in that the auxiliary wheel is mounted on a bracket that is in turn slidably supported on the beam and in that the locking means includes holes formed through the bracket and the beam and at least one pin for insertion through the holes in the bracket and the beam to prevent movement of the bracket on the beam.

9. The improvement according to claim 6 further including an elongate handle and means for attaching the handle to the beam in a first position wherein the handle extends perpendicular to the beam and parallel to the back, in a second position wherein the handle extends perpendicular to both the beam and the back and in a third position wherein the handle extends parallel to the beam.

10. The improvement according to claim 9 further characterized in that the base has a hole formed through it and further including means for securing the handle to the base through the hole.

References Cited

UNITED STATES PATENTS

| 483,006 | 9/1892 | Nichless | 280—47.2 X |
| 2,513,604 | 7/1950 | Vandemark | 280—47.12 |
| 2,651,525 | 9/1953 | Achee | 280—5.32 |
| 3,337,228 | 8/1967 | Shulkin | 280—47.27 |

LEO FRIAGLIA, Primary Examiner

JOHN A. PEKAR, Assistant Examiner

U.S. Cl. X.R.

280—47.27